US010017994B2

(12) United States Patent
von Gynz-Rekowski et al.

(10) Patent No.: US 10,017,994 B2
(45) Date of Patent: Jul. 10, 2018

(54) BORING APPARATUS AND METHOD

(71) Applicant: ASHMIN HOLDING LLC, Conroe, TX (US)

(72) Inventors: Gunther H H von Gynz-Rekowski, Montgomery, TX (US); Michael V. Williams, Montgomery, TX (US)

(73) Assignee: Ashmin Holding LLC, Conroe, TX (US)

( * ) Notice: Subject to any disclaimer, the term of this patent is extended or adjusted under 35 U.S.C. 154(b) by 274 days.

(21) Appl. No.: 14/864,016

(22) Filed: Sep. 24, 2015

(65) Prior Publication Data

US 2016/0108678 A1 Apr. 21, 2016

Related U.S. Application Data

(60) Provisional application No. 62/065,372, filed on Oct. 17, 2014.

(51) Int. Cl.
*E21B 10/26* (2006.01)
*E21B 6/02* (2006.01)
(Continued)

(52) U.S. Cl.
CPC ............... *E21B 6/02* (2013.01); *E21B 10/14* (2013.01); *E21B 10/26* (2013.01); *E21B 10/40* (2013.01); *E21B 17/07* (2013.01)

(58) Field of Classification Search
CPC . E21B 6/02; E21B 10/14; E21B 10/26; E21B 10/40; E21B 17/07
(Continued)

(56) References Cited

U.S. PATENT DOCUMENTS

| 1,746,455 A | 2/1930 | Woodruff et al. |
|---|---|---|
| 2,054,255 A | 9/1936 | Howard |

(Continued)

FOREIGN PATENT DOCUMENTS

| EP | 0432786 A1 | 6/1991 |
|---|---|---|
| EP | 0432786 B1 | 6/1995 |
| WO | 2009111887 | 9/2009 |

OTHER PUBLICATIONS

PCT International Searching Authority/US, International Search Report, dated Feb. 2, 2016, for PCT/US2015/53389, "Boring Apparatus and Method."

(Continued)

*Primary Examiner* — Taras P Bemko
(74) *Attorney, Agent, or Firm* — Jones Walker LLP

(57) ABSTRACT

An apparatus for boring a wellbore, including a bit body having a first end, an inner cavity, and a second end. The first end is connected to a workstring that is configured to deliver a rotational force to the bit body. The inner cavity contains a profile having a first radial cam surface. The second end includes a working face containing a cutting member. The apparatus also includes a pilot bit rotatively connected within the inner cavity. A second radial cam surface is contained on a first end of the pilot bit. The first and second radial cam surfaces are operatively configured to deliver a hammering force. A second end of the pilot bit may include an engaging surface configured to engage a formation surrounding the wellbore. The bit body rotates relative to the pilot bit.

42 Claims, 15 Drawing Sheets

(51) Int. Cl.
*E21B 10/40* (2006.01)
*E21B 17/07* (2006.01)
*E21B 10/14* (2006.01)

(58) Field of Classification Search
USPC .......................................................... 175/57
See application file for complete search history.

(56) References Cited

U.S. PATENT DOCUMENTS

| | | |
|---|---|---|
| 2,540,464 A | 2/1951 | Stokes |
| 2,725,215 A | 11/1955 | Macneir |
| 2,901,223 A | 8/1959 | Scott |
| 2,963,102 A | 12/1960 | Smith |
| 3,443,446 A | 5/1969 | Buergel |
| 4,718,291 A | 1/1988 | Wood et al. |
| 5,028,217 A | 7/1991 | Miller |
| 5,809,837 A | 9/1998 | Shaffer |
| 6,231,468 B1 | 5/2001 | Bajulaz |
| 7,198,119 B1 | 4/2007 | Hall et al. |
| 7,419,016 B2 | 9/2008 | Hall et al. |
| 7,591,327 B2 | 9/2009 | Hall et al. |
| 7,954,401 B2 | 6/2011 | Hall et al. |
| 2004/0182189 A1 | 9/2004 | Frenken |
| 2006/0237234 A1* | 10/2006 | Dennis ................... E21B 4/02 175/95 |
| 2011/0048810 A1* | 3/2011 | Lin ...................... E21B 10/25 175/371 |
| 2014/0144705 A1* | 5/2014 | Baudoin ................ E21B 1/00 175/57 |
| 2015/0107904 A1 | 4/2015 | Kerstetter |

OTHER PUBLICATIONS

PCT International Searching Authority/US, Written Opinion of the International Searching Authority, dated Feb. 2, 2016, for PCT/US2015/53389, "Boring Apparatus and Method."

Extended European Search Report dated May 9, 2018, in Applicant's counterpart European Patent Application No. 15850474.6.

* cited by examiner

BORING APPARATUS AND METHOD

CROSS-REFERENCE TO RELATED APPLICATIONS

This application claims the benefit of and priority to U.S. Provisional Patent Application No. 62/065,372, filed on Oct. 17, 2014, which is incorporated herein by reference.

BACKGROUND OF THE INVENTION

This disclosure relates to a boring apparatus and method. More particularly, but not by way of limitation, this invention relates to a drill bit and a method of boring wells.

Drill bits have been used for boring subterranean wells. In the boring of a wellbore, the operator seeks to drill the well efficiently, safely, and economically. Drill bits are required to drill straight wells, deviated wells, horizontal wells, multilaterals, etc. Various drill bits have been proposed through the years, including roller-cone bits and polycrystalline diamond compact bits.

SUMMARY OF THE INVENTION

In one embodiment, an apparatus is disclosed that includes a rotating segment having a first radial surface with a first circumferential profile; a non-rotating segment having a second radial surface with a second circumferential profile; a housing disposed around the first and second radial surfaces; and one or more rolling elements disposed between and in contact with the first and second radial surfaces for transferring the non-rotating segment in an axial direction upon rotation of the rotating segment. Each rolling element moves 360 degrees along a circular path relative to the first radial surface and 360 degrees along a circular path relative to the second radial surface. The rotating segment rotates more than 360 degrees relative to the non-rotating segment. The first circumferential profile may include the tapered section, which may include an undulating waveform profile. The second circumferential profile may include the tapered section, which may include an undulating waveform profile. Each of the rolling elements may include a spherical outer surface. In one embodiment, the apparatus may include two rolling elements in contact with one another, and with each rolling element having a diameter that is equal to one-half of an inner diameter of the housing. In another embodiment, the apparatus may include three or more rolling elements, with each rolling element in contact with two adjacent rolling elements. In yet another embodiment, the apparatus may include two or more rolling elements and a guide member, which is disposed between the first and second radial surfaces for retaining the rolling elements in a fixed position relative to one another.

In another embodiment, an apparatus is disclosed that includes a first rotating segment having a first radial surface with a first circumferential profile; a second rotating segment having a second radial surface with a second circumferential profile; a housing disposed around the first and second radial surfaces; and one or more rolling elements disposed between and in contact with the first and second radial surfaces for transferring the second rotating segment in an axial direction upon rotation of the first rotating segment. The second rotating segment rotates at different rotational rate than the first rotating segment. Alternatively, first and second rotating segments rotate in opposite directions. Each rolling element moves 360 degrees along a circular path relative to the first radial surface and 360 degrees along a circular path relative to the second radial surface. The first rotating segment rotates more than 360 degrees relative to the second rotating segment. The first circumferential profile may include the tapered section, which may include an undulating waveform profile. The second circumferential profile may include the tapered section, which may include an undulating waveform profile. Each of the rolling elements may include a spherical outer surface. In one embodiment, the apparatus may include two rolling elements in contact with one another, and with each rolling element having a diameter that is equal to one-half of an inner diameter of the housing. In another embodiment, the apparatus may include three or more rolling elements, with each rolling element in contact with two adjacent rolling elements. In yet another embodiment, the apparatus may include two or more rolling elements and a guide member, which is disposed between the first and second radial surfaces for retaining the rolling elements in a fixed position relative to one another.

In another embodiment, an apparatus for boring a well is disclosed, with the apparatus being connected to a workstring. The apparatus includes a bit body having a first end, an inner cavity, and second end, with the first end connected to the workstring that is configured to deliver a rotational force to the bit body. The inner cavity contains a profile having a first radial cam surface. The second end of the bit body includes a working face containing a cutting member. The apparatus also includes a pilot bit rotatively connected within the inner cavity of the bit body. The pilot bit extends from the working face. The pilot bit includes a first end and a second end. The first end of the pilot bit has a second radial cam surface operatively configured to cooperate with the first radial cam surface to deliver a hammering force. The second end of the pilot bit includes an engaging surface configured to engage a formation surrounding the wellbore. The bit body rotates at a different rate than the pilot bit. The first radial cam surface may include an inclined portion and an upstanding portion. The second radial cam surface may include an inclined portion and an upstanding portion. The engaging surface may include an eccentric conical surface. Alternatively, the engaging surface may include a chiseled surface. The workstring may contain a mud motor for delivering rotational force. The apparatus may further include a retainer operatively associated with the pilot bit for retaining the pilot bit within the inner cavity. The workstring may be a tubular drill string or a coiled tubing string. The apparatus may further include one or more rolling elements disposed between and in contact with the first and second radial cam surfaces. Each of the rolling elements may be a spherical outer surface. The apparatus may include two rolling elements in contact with one another, where a diameter of each of the rolling elements is equal to one-half of an inner diameter of the inner cavity. The apparatus may include three or more rolling elements, with each of the rolling elements in contact with two adjacent rolling elements. The apparatus may include two or more rolling elements and a guide member, which is disposed between the first and second radial cam surfaces for retaining the rolling elements in a fixed position relative to one another.

A method of boring a wellbore is also disclosed. The method includes providing a bit apparatus within the wellbore, with the bit apparatus comprising: a bit body having a first end, an inner cavity, and second end, with the first end connected to the workstring that is configured to deliver a rotational force to the bit body; the inner cavity containing a profile having a first radial cam surface; the second end including a working face containing a cutting member; the apparatus also including a protuberance rotatively connected within the inner cavity of the bit body and extending from the working face; the protuberance including a first end and a second end, with the first end having a second radial cam surface and the second end having an engaging surface. The method further includes lowering the bit apparatus into the wellbore, contacting the cutting member of the working face with a reservoir interface, rotating the bit body relative to the protuberance, engaging the engaging surface of the protuberance with the reservoir interface in the wellbore, and impacting the second radial cam surface with the first radial cam surface so that a percussive force is delivered to the cutting member and the engaging surface while drilling the wellbore. In one embodiment, the first radial cam surface comprises an inclined portion and an upstanding portion, and the second radial cam surface comprises an inclined portion and an upstanding portion. The workstring may contain a mud motor for delivering a rotational force. The workstring may be a tubular drill string, production string, or a coiled tubing string. Additionally, the engaging surface may be an eccentric conical surface or a chiseled surface. The protuberance may be rotated due to frictional forces associated with the rotation of the bit body, with a rotation rate of the protuberance being different than a rotation rate of the bit body. The bit apparatus may also include one or more rolling elements disposed between and in contact with the first and second radial cam surfaces, and the method may include impacting the second radial cam surface with the first radial cam surface through the rolling elements. Each of the rolling elements may include a spherical outer surface.

In yet another embodiment, an apparatus for boring a well is disclosed, with the apparatus being connected to a workstring. The apparatus includes a bit body having a first end, an inner cavity, and second end, with the first end connected to the workstring that is configured to deliver a rotational force to the bit body. The inner cavity contains a profile having a hammer. The second end of the bit body includes a working face containing a plurality of cutting members. The apparatus also includes a protuberance rotatively connected within the inner cavity of the bit body. The protuberance extends from the working face. The protuberance includes a first end and a second end. The first end of the protuberance contains an anvil. The second end of the protuberance contains an engaging surface configured to engage a formation surrounding the wellbore. The hammer is operatively configured to deliver a hammering force to the anvil. The bit body rotates relative to the protuberance. The workstring may contain a mud motor for delivering rotational force. The hammer may include an inclined portion and an upstanding portion. The anvil may include an inclined portion and an upstanding portion. Alternatively, the profile of the inner cavity further includes a first radial cam surface, and the first end of the protuberance further includes a second radial cam surface configured to cooperate with the first radial cam surface. The apparatus may further include a retainer operatively associated with the protuberance to retain the protuberance within the inner cavity. The engaging surface may include an eccentric conical surface or a chiseled surface. The workstring may be a tubular drill string or a coiled tubing string. The protuberance may rotate at a different rotational rate than the bit body. The apparatus may further include one or more rolling elements disposed between and in contact with the hammer and the anvil. Each of the rolling elements may be a spherical outer surface. The apparatus may include two rolling elements in contact with one another, where a diameter of each of the rolling elements is equal to one-half of an inner diameter of the inner cavity.

The apparatus may include three or more rolling elements, with each of the rolling elements in contact with two adjacent rolling elements. The apparatus may include two or more rolling elements and a guide member, which is disposed between the hammer and the anvil for retaining the rolling elements in a fixed position relative to one another.

DETAILED DESCRIPTION OF THE PREFERRED EMBODIMENTS

Figure 1:
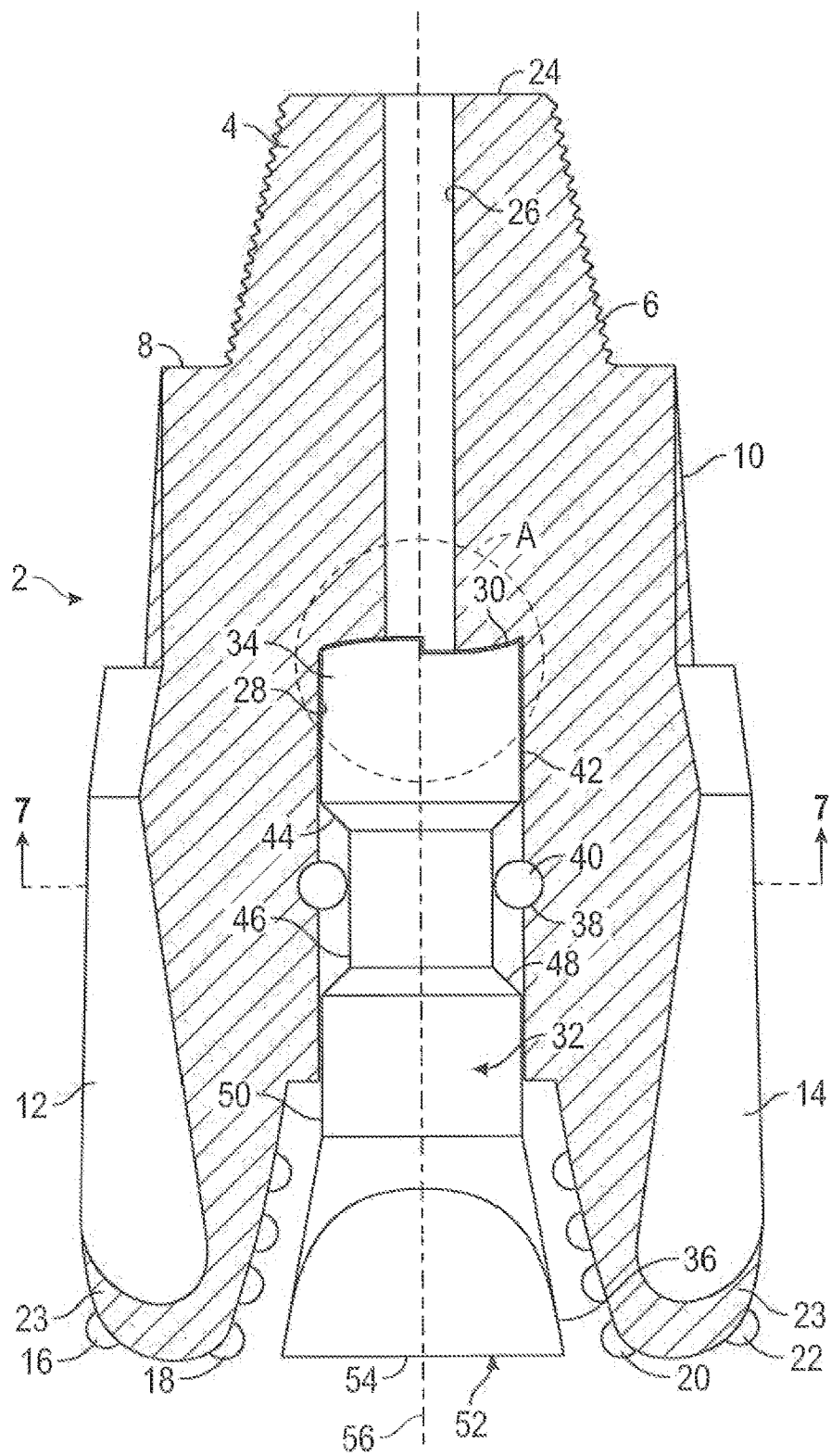
FIG. 1 is a partial sectional view of one embodiment of the bit disclosed in this specification, with only the bit shown in section.

FIG. 1 is a sectional view of one embodiment of the bit 2 disclosed in this specification. The bit 2 includes a first end 4 having an outer diameter that contains external thread means 6, wherein the external thread means 6 will connect to a workstring (not seen in this view). Bit 2 may be any tool that is capable of drilling a bore into a rock formation, such as a drag bit, a roller cone bit, a chisel-type bit, or a mill. As appreciated by those of ordinary skill in the art, the workstring may include a bottom hole assembly that includes measurement while drilling instruments, mud motor means, and drill collars (note that this list is illustrative). The external thread means 6 extends to a radial shoulder 8 which in turn extends to the outer conical surface 10. As seen in FIG. 1, the outer conical surface 10 extends to a plurality of blades, including blades 12 and 14. The bit 2, and in particular the blades 12, 14, contain cutting members for drilling and crushing subterranean rock as appreciated by those of ordinary skill in the art. In one embodiment, the blades 12, 14 comprise leg portions upon which the cutting members can be connected. For instance, FIG. 1 depicts cutting members 16, 18, 20, 22 connected to the distal ends 23 (also referred to as the working face 23) of the leg portions of the blades 12, 14. Hence, the cutting members 16, 18, 20, 22 are contained on the working face 23 of the bit 2.

The bit 2 also contains a radially flat top surface 24 which extends radially inward to the inner diameter portion 26. The inner diameter portion 26 stretches to the opening, seen generally at 28. Opening 28 is sometimes referred to as an inner cavity. The opening 28 has an internal profile 30, wherein the profile 30 contains a first radial cam surface which will be described with reference to FIG. 2. The opening 28 extends to the bottom of the bit 2. As seen in FIG. 1, disposed within the opening 28 is the pilot bit 32 (the pilot bit 32 may be referred to as the protuberance 32). Pilot bit 32 may, but need not, extend beyond working face 23 of bit 2. The pilot bit 32 has a first end (generally seen at 34) and a second end (generally seen at 36). The first end 34 contains a second radial cam surface which will be described with reference to FIG. 3. It should be noted that the first and second radial cam surfaces cooperate together as will be more fully explained later in the disclosure.

As seen in FIG. 1, the opening 28 further includes the increased diameter circumference area 38 which is adapted for placement of retainer 40 therein for retaining pilot bit 32 within opening 28. Retainer 40 may be ball members as shown. Alternatively, retainer 40 may be a pin, set screw, or other similar mechanism disposed at least partially within opening 28 for retaining pilot bit 32 within opening 28. Any number of retainers 40 may be included. More specifically, the pilot bit 32 contains a first outer diameter surface 42 which stretches to the chamfered surface 44 which in turn extends to the second outer diameter surface 46, then to the chamfered surface 48, then to third outer diameter surface 50. In the embodiment depicted in FIG. 1, the third outer diameter surface 50 extends to the chiseled profile surface, seen generally at 52, with the chiseled profile surface 52 having a beveled end 54 for contacting the subterranean rock. The center line 56 runs through the inner diameter portion 26 of the bit 2 as well as through the beveled end 54 of the pilot bit 32. The ball bearing members 40 allow the rotation of the bit 2 as well as the rotation of the pilot bit 32. In one embodiment, ball bearing members 40 allow bit 2 and pilot bit 32 to rotate at different speeds such that the bit 2 may have a first rotation rate, measured in revolutions per minute (RPM), while the pilot bit 32 may have a second rotation rate, also measured in RPM. First and third outer diameter surfaces 42 and 50 of pilot bit 32 may function as radial bearings, along with the inner surfaces of opening 28 of bit 2.

Figure 2:
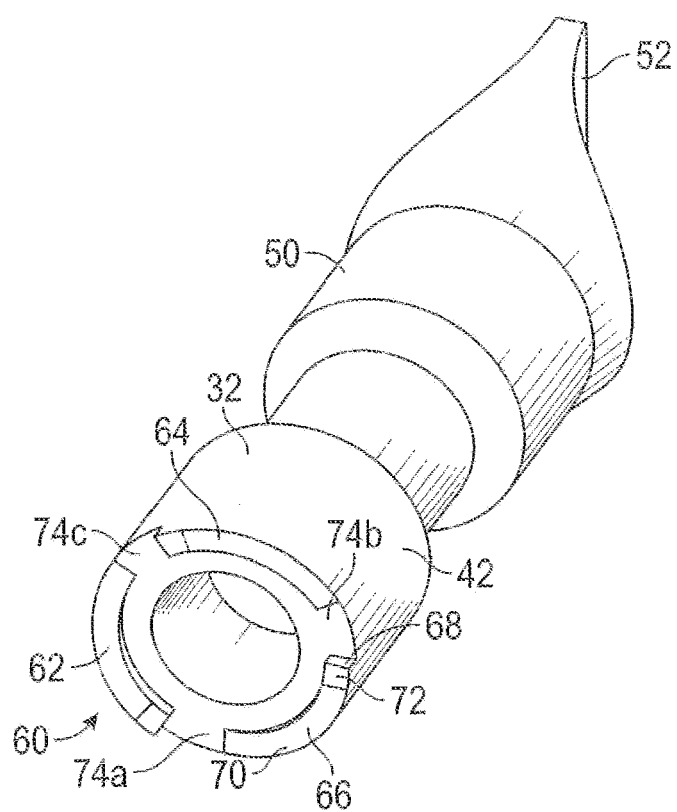
FIG. 2 is a perspective view of one embodiment of a cam surface on a pilot bit.

Referring now to FIG. 2, a perspective view of one embodiment of the second radial cam surface 60 on the pilot bit 32 will now be described. It should be noted that like numbers refer to like components in the various drawings. FIG. 2 depicts the outer diameter surface 42 as well as the outer diameter surface 50, with the outer diameter surface 50 extending to the chiseled profile surface 52. In one embodiment, the second radial cam surface 60 contains three ramps, namely ramps 62, 64, 66. The ramps 62, 64, and 66 will cooperate with the internal profile 30 to deliver the hammering force as will be more fully explained below. The ramp 66 contains an upstanding portion 68, an inclined portion 70 and a flat portion 72 that is intermediate of the inclined portion 70 and upstanding portion 70. The ramps 62, 64, and 66 are of similar construction. The radially flat area 74a, 74b, 74c will be the area that the two radial cams will impact during the hammering action. In other words, the radially flat areas 74a, 74b, 74c receive the hammering force and not the ramp surfaces.

Figure 3:
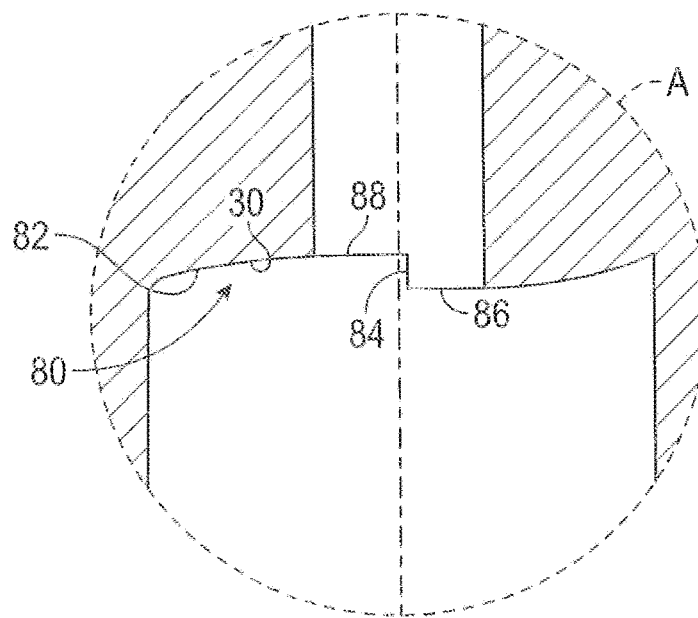
FIG. 3 is an enlarged, partial sectional view of the area marked as "A" in FIG. 1 which depicts the radial cam surface within the bit, with only the bit shown in section.

Referring specifically to FIG. 3, which is an enlarged partial sectional view of the circled area marked "A" in FIG. 1 will now be described. FIG. 3 depicts the first radial cam surface 80 on the internal profile 30 of bit 2. FIG. 3 shows the inclined portion 82 which stretches to the upstanding portion 84 that then levels off to a flat portion 86. The radially flat area is depicted at 88. The inclined portion 82, upstanding portion 84, the flat portion 86, and the radially flat area 88 are reciprocal with the second radial cam surface 60 previously described. The second radial cam surface 60 will cooperate with first radial cam surface 80 in order to generate a hammer force as per the teachings of this disclosure. Internal profile 30 engages and cooperates with second radial cam surface 60 so that as bit 2 rotates relative to pilot bit 32 (i.e., pilot bit 32 does not rotate or pilot bit 32 rotates at a different rotational rate than bit 2), flat portion 86 of internal profile 30 slides up inclined portion 70, across flat portion 72, over upstanding portion 68, and onto flat area 74b of second radial cam surface 60. As flat portion 86 falls onto flat area 74b of second radial cam surface 60, a percussive force will be generated in an axial direction through bit 2 and pilot bit 32 for assisting in drilling through a subterranean formation. In one embodiment, the second radial cam surface 60 is an anvil member and the first radial cam surface 80 is a hammer member.

Figure 4:
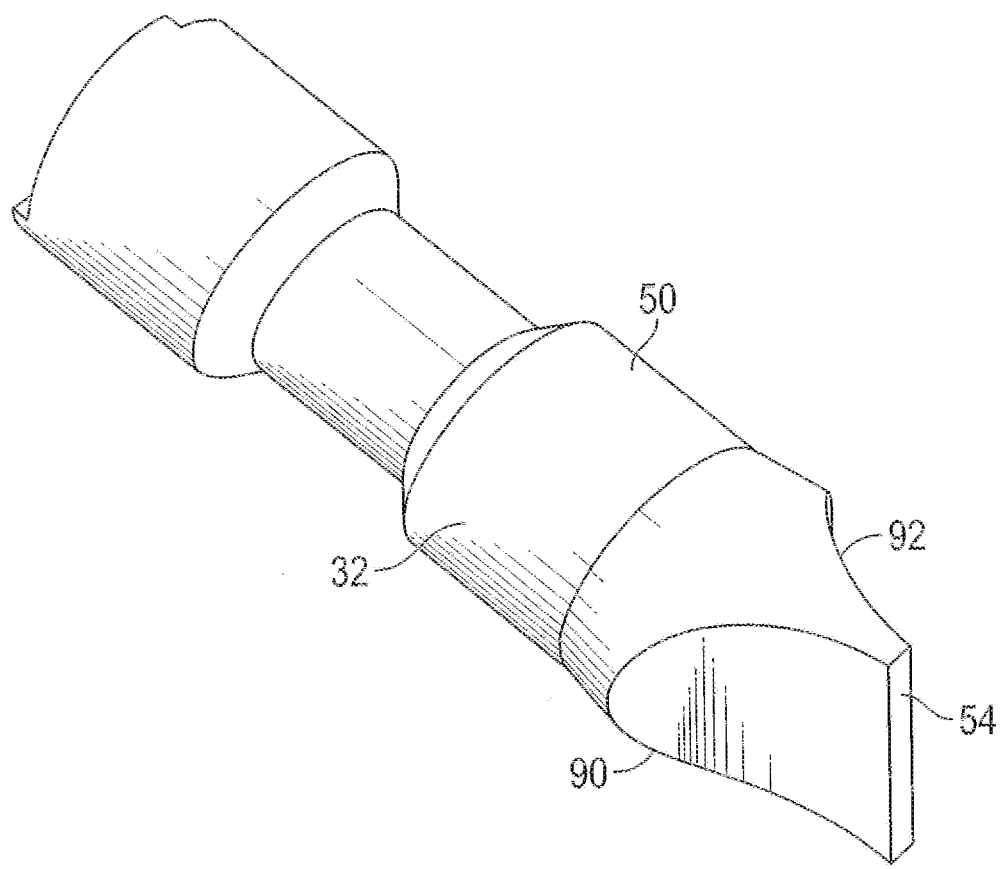
FIG. 4 is a perspective view of the pilot bit seen in FIG. 1.

FIG. 4 is a perspective view of the first embodiment of the pilot bit member, namely pilot bit 32. As seen in FIG. 4, the outer diameter surface 50 extends to the first concave surface 90 as well as the second concave surface 92 which in turn extends to the beveled end 54. Hence, as drilling progresses, the beveled end 54 may contact the subterranean rock which in turn will be crushed and chiseled.

Figure 5:
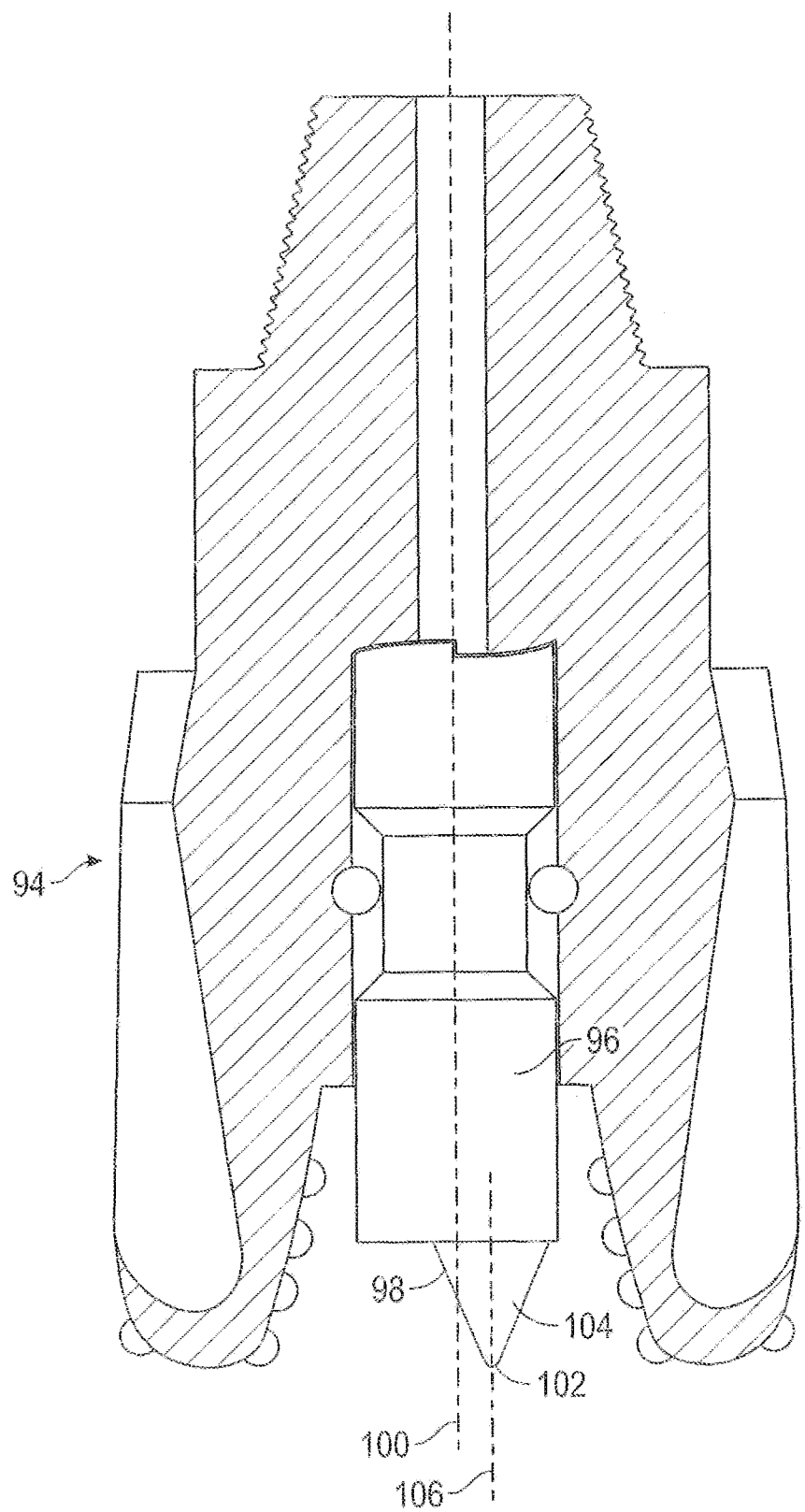
FIG. 5 is a partial sectional view of a second embodiment of the bit disclosed in this specification, with only the bit shown in section.

FIG. 5 is a sectional view of a second embodiment of bit 94, with FIG. 5 depicting the second embodiment of the pilot bit 96 containing the eccentric conical surface 98. The bit 94 is the same as the bit 2 depicted in FIG. 1 except for the pilot bit 96. As seen in FIG. 5, the center line 100 through the center of the bit 94 is offset from the apex 102 of the cone portion 104 of pilot bit 96. The center line 106 of the cone portion 104 is offset from the center line 100 of the bit 94 thereby forming an eccentric conical surface 104. Because of this offset (i.e., the eccentric distance), a higher torque is required to rotate pilot bit 96, which in turn requires a higher friction between the radial cam surfaces of bit 94 and pilot bit 96 in order to rotate pilot bit 96. With a greater eccentric distance of apex 102, a higher torque will be required to rotate pilot bit 96. Thus, the eccentric distance produces a higher difference between the rotational rate of bit 2 and the rotational rate of pilot bit 96 (i.e., a higher relative rotation), thereby increasing the frequency of impacts created by the interaction of the radial cam surfaces.

Figure 6:
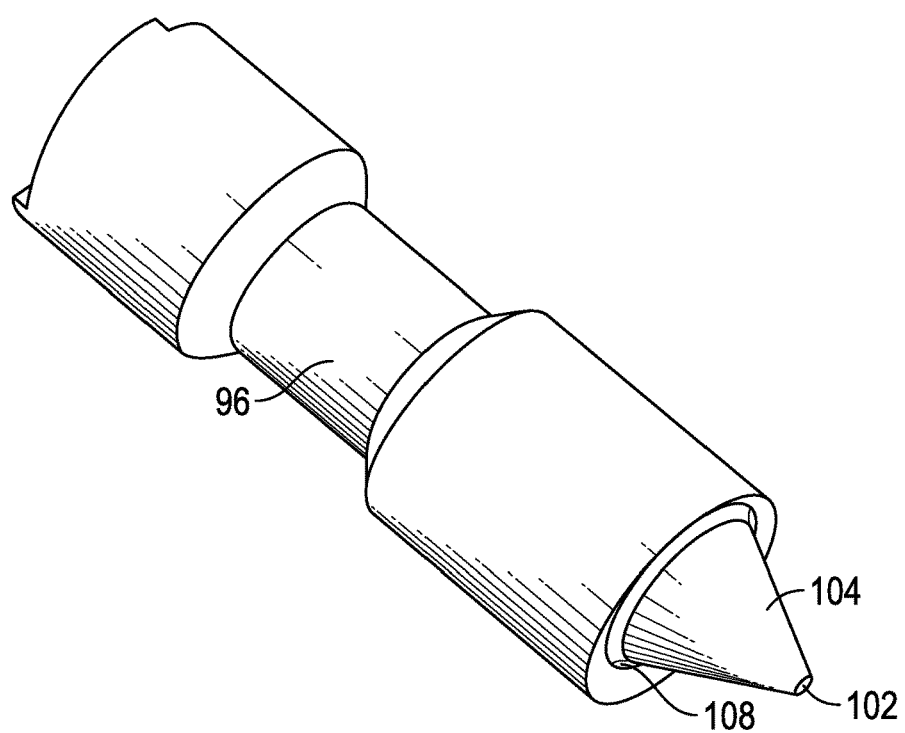
FIG. 6 is a perspective view of the second embodiment of the pilot bit seen in FIG. 5.

Referring now to FIG. 6, a perspective view of the second embodiment of the pilot bit member 96 seen in FIG. 5 will now be described. The pilot bit 96 contains at the distal end the cone portion 104 that leads to the apex 102. The cone portion 104 is eccentrically positioned which forms a radial area 108. The cone portion 104 may be integrally formed on the body of the pilot bit 96 or may be attached such as by welding.

Figure 7:
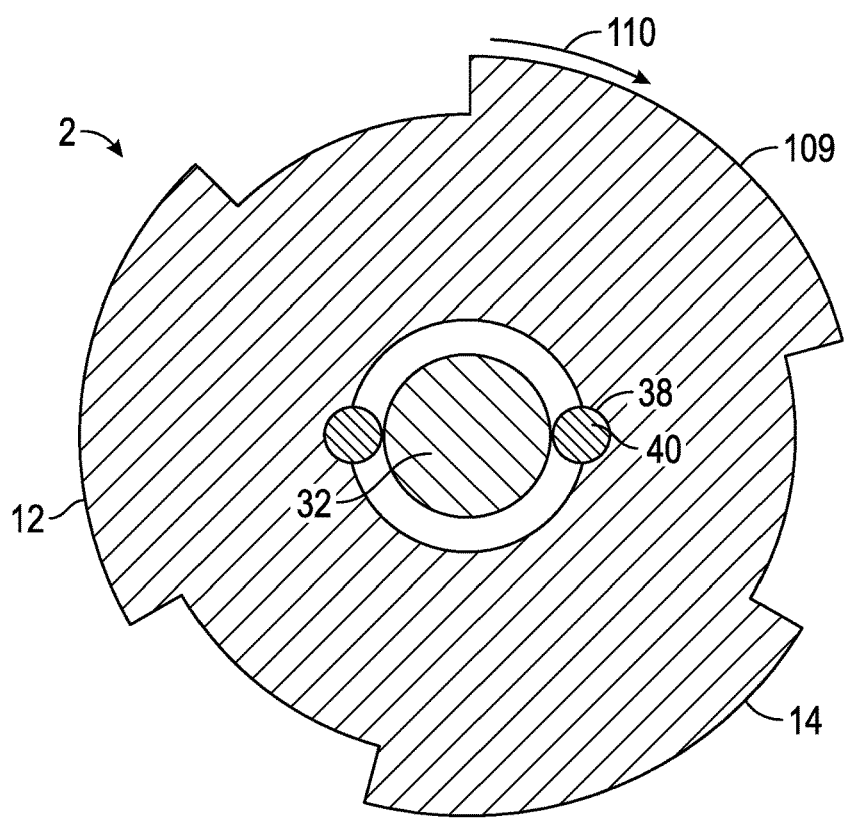
FIG. 7 is a cross-sectional view of the bit of FIG. 1 taken along line A-A.

FIG. 7 is a cross-sectional view of the bit 2 of FIG. 1 taken along line 7-7. Hence, the pilot bit 32 is shown along with the ball bearing members, such as member 40, with the ball bearing member 40 being positioned in the increased diameter circumference area 38. Also shown are the blades 12, 14 along with blade 109. FIG. 7 shows how the bit 2 may rotate in a clockwise direction 110 relative to pilot bit 32. While bit 2 is configured to rotate, pilot bit 32 is not designed to rotate. Accordingly, pilot bit 32 may be a non-rotating member. In one embodiment, however, frictional forces may cause pilot bit 32 to rotate. In that case, pilot bit 32 will rotate at a different rotational rate than bit 2.

Figure 8:
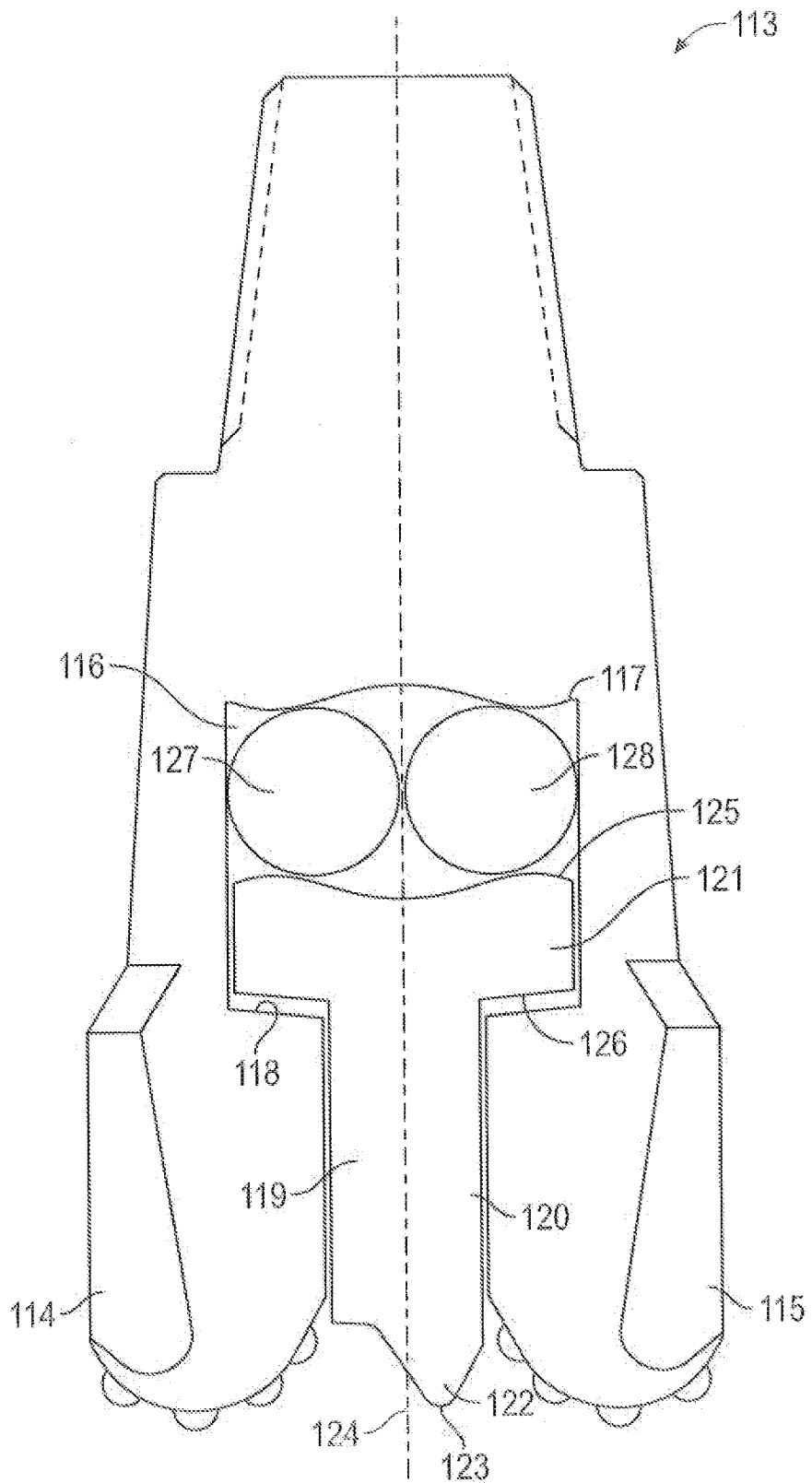
FIG. 8 is a cutaway view of a third embodiment of the bit disclosed in this specification, with a portion of the bit cutaway.

FIG. 8 illustrates another embodiment of bit 113. Except as otherwise noted, bit 113 is the same as bit 2. Bit 113 may include blades 114 and 115. Bit 113 may also include inner cavity 116 extending at least from radial cam surface 117 to radial surface 118. Pilot bit 119 may include shaft portion 120 extending from upper portion 121 to cone portion 122. Apex 123 of cone portion 122 may be offset from center line 124 of bit 113. Upper portion 121 may include radial cam surface 125 and radial shoulder 126. Radial surface 118 of bit 113 may retain upper portion 121 of pilot bit 119 within inner cavity 116.

Bit 113 may further include rolling elements 127 and 128 positioned between and in contact with radial cam surfaces 117 and 125. Rolling elements 127, 128 may also be referred to as rotating elements. In one preferred embodiment, rolling elements 127, 128 are spherical members such as stainless steel ball bearings or ceramic balls. In this embodiment, each spherical member may have a diameter that is approximately equal to one-half of the inner diameter of inner cavity 116, such that the spherical members are in contact with one another. It should be understood that bit 113 may include any number of rolling elements. The number of rolling elements included may be equal to the number of high points or ramps on each of radial cam surfaces 117 and 125. Each of the rolling elements may be the same size.

Rolling elements 127, 128 may be free to move between radial cam surfaces 117 and 125 as bit 113 rotates relative to pilot bit 119. In one embodiment, rolling elements 127, 128 may move in a circular path on radial cam surface 125 as bit 113 rotates relative to pilot bit 119. This movement of rolling elements 127, 128 over radial cam surfaces 117 and 125 may cause axial movement of pilot bit 119 relative to bit 113. Use of rolling elements 127, 128 allows for less of a direct impact between radial cam surfaces 117 and 125 of bit 113 and pilot bit 119, which may increase the life of bit 113 and pilot bit 119.

Figure 9A:
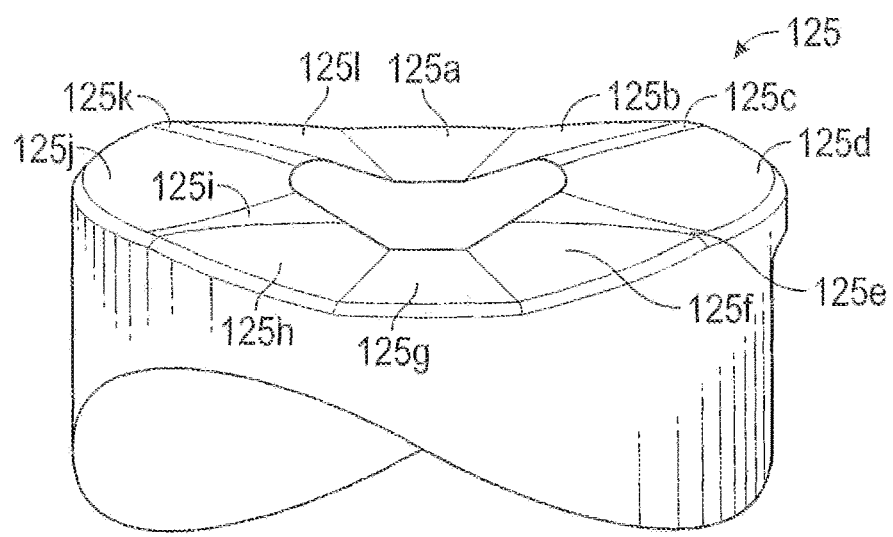
FIG. 9A is a perspective view of a radial cam surface of the bit shown in FIG. 8.
Figure 9B:
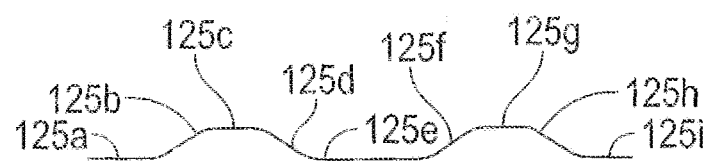
FIG. 9B is a schematic view of the circumferential profile of the radial cam surface shown in FIG. 9A.
Figure 9C:
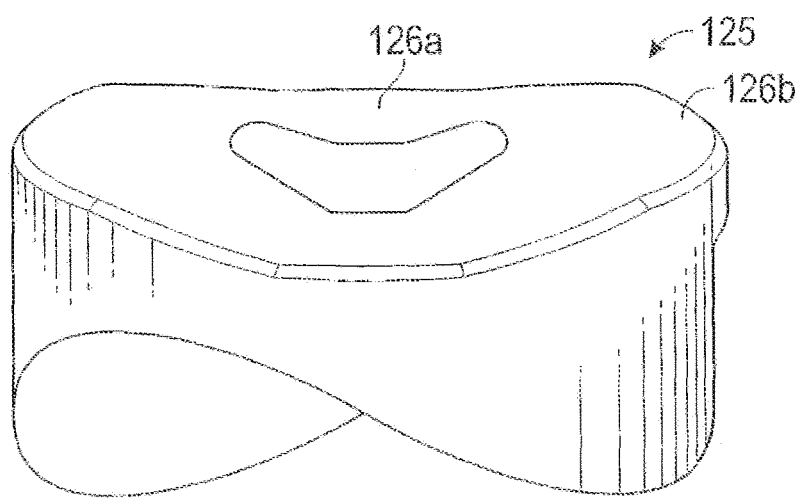
FIG. 9C is a perspective view of an alternate radial cam surface.

FIG. 9A illustrates a first embodiment of radial cam surface 125. In this embodiment, radial cam surface 125 includes a series of surfaces, namely surfaces 125a, 125b, 125c, 125d, 125e, 125f, 125g, 125h, 125i, 125j, 125k, 125l. Several of these surfaces may have a rising or falling slope such that radial cam surface 125 has a multiple segmented radial face. FIG. 9B is a circumferential profile view of radial cam surface 125 shown in FIG. 9A. FIG. 9C illustrates another embodiment of radial cam surface 125. In this embodiment, radial cam surface 125 includes cam low side 126a and cam high side 126b. The profile of this embodiment of radial cam surface 125 may be a smoother waveform. In one embodiment, the profile of radial cam surface 125 is a sinusoidal waveform. It should be noted that the embodiments of radial cam surface 125 shown in FIGS. 9A and 9C may both be referred to as an undulating profile. Radial cam surface 117 of bit 113 may have a reciprocal shape to radial cam surface 125. Alternatively, one of radial cam surfaces 117 and 125 may be a flat radial surface.

Figure 10:
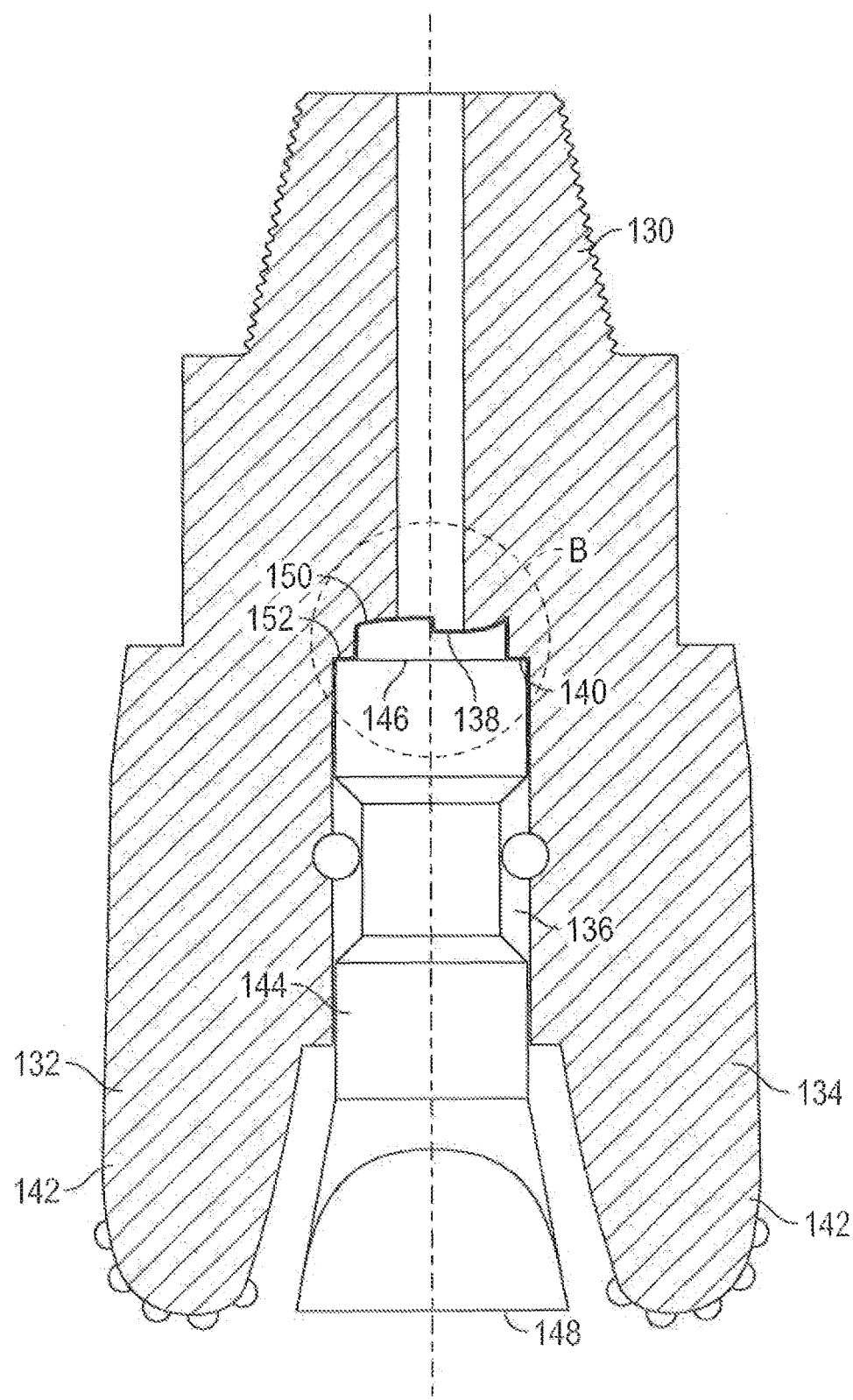
FIG. 10 is a partial cross-sectional view of a fourth embodiment of the bit disclosed in this specification, with only the bit shown in section.

FIG. 10 is a sectional view of a yet another embodiment of bit 130. Except as otherwise noted, bit 130 is the same as bit 2. Bit 130 may include blades 132 and 134. Bit 130 may also include inner cavity 136 leading from radial cam surface 138 and hammer surface 140 to working face 142. Radial cam surface 138 and hammer surface 140 may be axially separated by a distance. Pilot bit 144 may be disposed within inner cavity 136 of bit 130. Pilot bit 144 may include first end 146 and second end 148. First end 146 may include radial cam surface 150 and anvil surface 152. Radial cam surface 150 and anvil surface 152 may be axially separated by a distance. Radial cam surface 150 may cooperate with radial cam surface 138, and anvil surface 152 may cooperate with hammer surface 140. Second end 148 of pilot bit 144 may include a chiseled profile surface (as shown) or an eccentric conical portion of the type discussed above.

Figure 11:
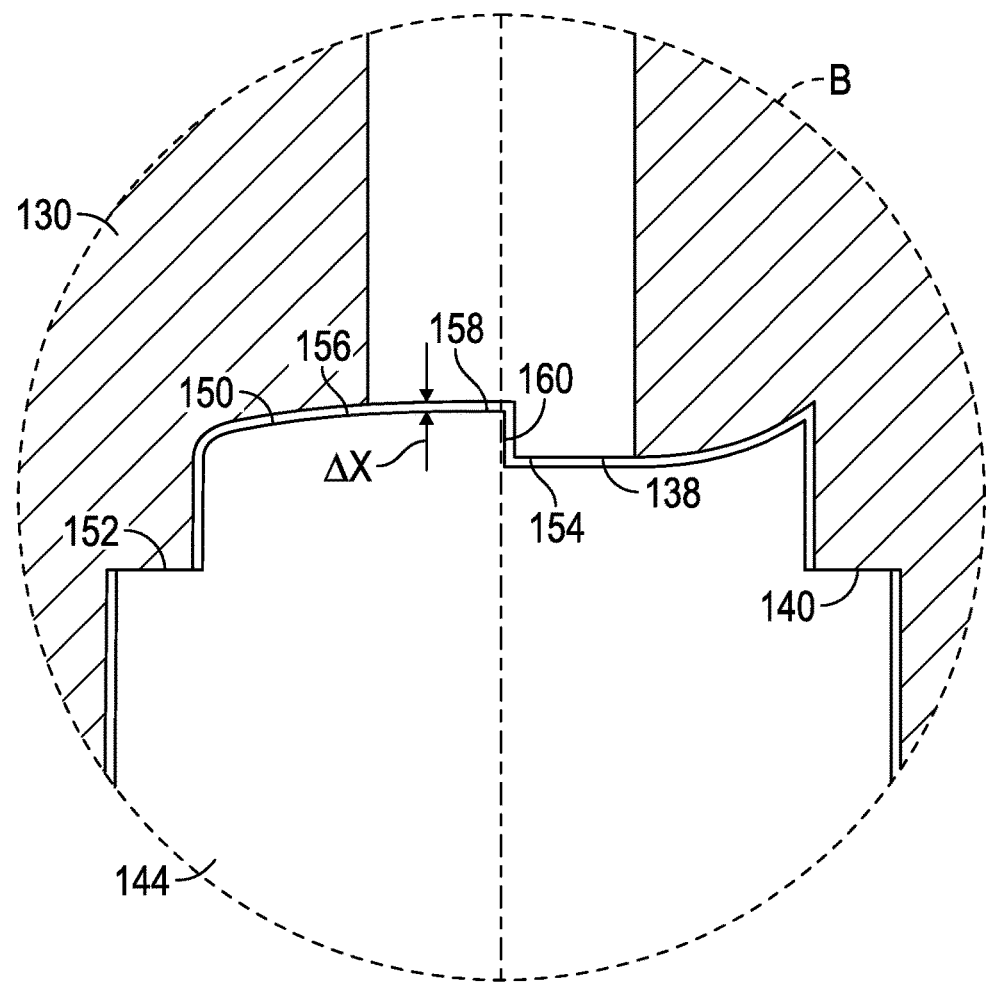
FIG. 11 is an enlarged, partial sectional view of the area marked as "B" in FIG. 10, with only the bit shown in section.

FIG. 11 is an enlarged view of the section B in FIG. 10. This view shows that when hammer surface 140 of bit 130 is in contact with anvil surface 152 of pilot bit 144, radial cam surfaces 138 and 150 are separated by the distance ΔX. As bit 130 rotates relative to pilot bit 144, radial cam surface 138 of bit 130 engages radial cam surface 150 of pilot bit 144. As explained above in connection with other embodiments, each high point 154 on radial cam surface 138 slides along each ramp 156 of radial cam surface 150. During this time, hammer surface 140 will separate from anvil surface 152. When each high point 154 of radial cam surface 138 slides over each high point 158 of radial cam surface 150, each high point 154 will drop over upstanding portions 160 of radial cam surface 150. This drop causes hammer surface 140 of bit 130 to impact anvil surface 152 of pilot bit 144. Because of the separation by distance ΔX, the impact force is not placed directly on radial cam surfaces 138 and 150. This arrangement will increase longevity of bit 130 and pilot bit 144 by reducing wear on radial cam surfaces 138 and 150. This embodiment may also include one or more rolling elements between radial cam surfaces 138 and 150. Where rolling elements are used, rolling elements may not be in contact with both cam surfaces when hammer surface 140 contacts and impacts anvil surface 152.

Figure 12:
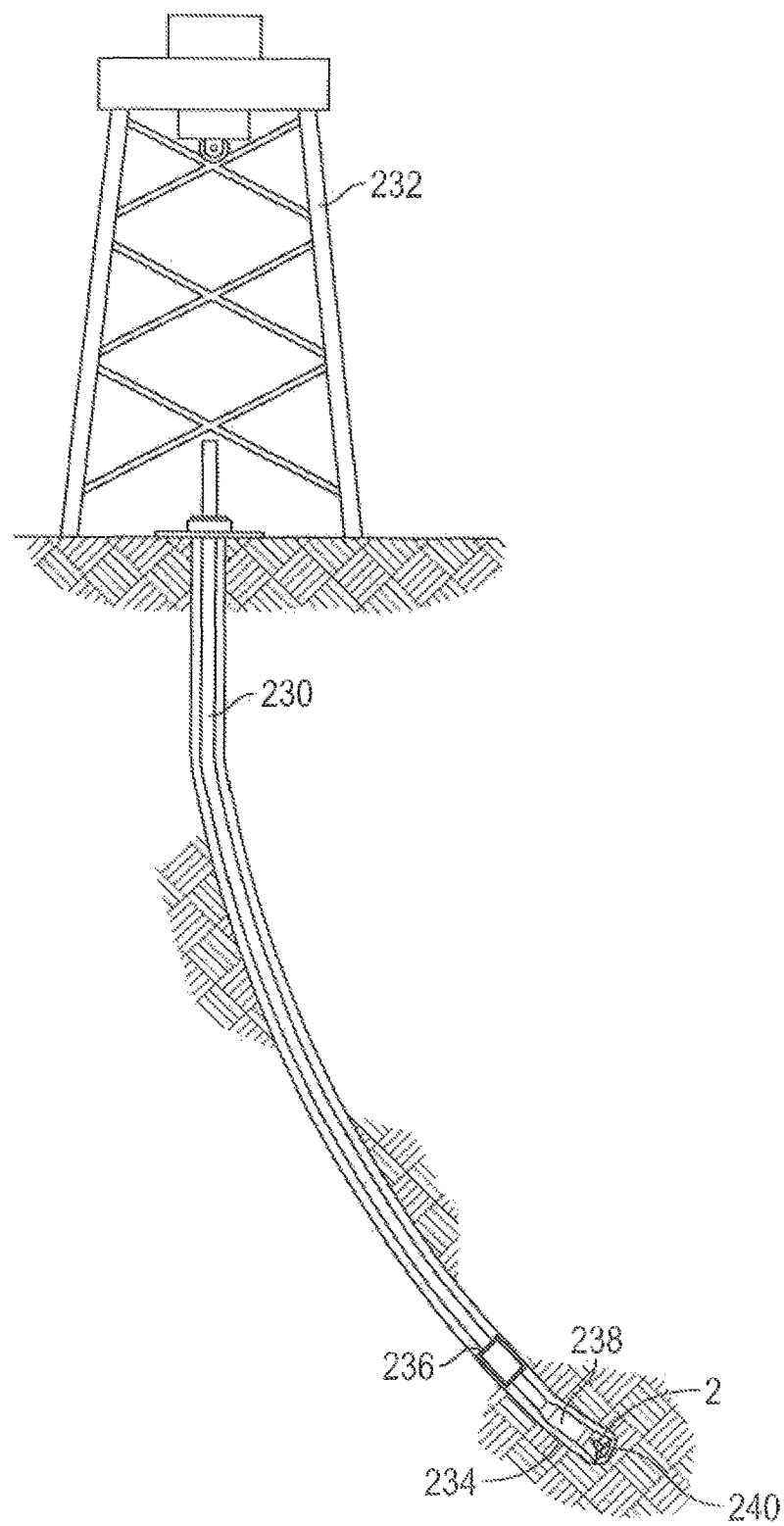
FIG. 12 is a schematic representation of a workstring extending from a rig, with the workstring being placed concentrically within a wellbore.

Referring now to FIG. 12, a schematic representation of a workstring 230 extending from a rig 232, with the workstring 230 being placed concentrically within a wellbore 234. The workstring 230 will be operatively connected to a bottom hole assembly, seen generally at 236. In the embodiment of FIG. 12, the bottom hole assembly 236 includes a mud motor means 238 for rotatively driving the bit 2. As understood by those of ordinary skill in the art, in the course of drilling a well, a drilling fluid is pumped through the workstring 230. The drilling fluid is channeled through the mud motor means thereby causing a segment of the bottom hole assembly to rotate. The rotative force is transferred to the bit 2 which will cause the bit 2 to be rotated relative to the pilot bit 32. Hence, the bit 2 is rotated so that a first rotation rate is achieved. The cutting members (e.g., cutting members 16, 18, 20, 22 shown in FIG. 1) contained on the working face 23 will also engage with the reservoir interface 240. The beveled end 54 of the pilot bit 32 (shown in FIG. 4), the apex 102 of pilot bit 96 (shown in FIG. 6), or the apex 123 of pilot bit 119 will engage the reservoir interface 240. It should be understood that unless otherwise noted, the bits 2, 94, 113, and 130 function in the same way and pilot bits 32, 96, 119, and 144 function in the same way.

Pilot bit 32 may not rotate during boring operations. However, relative rotation of bit 2 relative to pilot bit 32 may cause pilot bit 32 to rotate due to frictional forces. Relative rotation between bit 2 and pilot bit 32 may be caused by sliding and rolling friction between bit 2 and pilot bit 32 and by friction between both members and the reservoir rock surrounding the wellbore. Bit 2 and pilot bit 32 may require different torque values to overcome the rolling friction and friction with the reservoir rock, which may cause rotation of pilot bit 32 at a different rotation rate than that of bit 2. Relative rotation may also be caused by the eccentric offset of apex 102 from the center line of bit 94 when pilot bit 96 is used. Bit 2 may rotate at a higher rotation rate or speed than pilot bit 32. For example, the bit may rotate at 80-400 RPM, while the pilot bit may rotate at 2-10 RPM. The method further includes impacting the second radial cam surface 60 against the first radial cam surface 80 so that a percussive force is delivered to the working face 23 and the pilot bit 32. In this way, the relative rotation between bit 2 and pilot bit 32 is converted into a relative axial movement between bit 2 and pilot bit 32. The cutting and crushing action of the cutting members 16, 18, 20, 22 and pilot bit 32 coupled with the hammering force will drill the wellbore.

As previously noted, in one embodiment, the first radial cam surface comprises an inclined portion and upstanding portion and the second radial cam surface comprises an inclined portion and upstanding portion that are reciprocal and cooperate to create the hammering force on the radially flat areas, such as areas 74a, 74b, 74c seen in FIG. 2. In one embodiment, the workstring contains a mud motor for delivering a rotational force; however, other embodiments include surface rotary means for imparting rotation of the workstring from the rig floor. In another embodiment, the workstring is selected from the group consisting of a tubular drill string, a coiled tubing string, and snubbing pipe. A feature of one embodiment is that the engaging surface (i.e. distal end of the pilot bit 32) may be an eccentric conical surface, a chiseled surface, or other similar surface.

Figure 13:
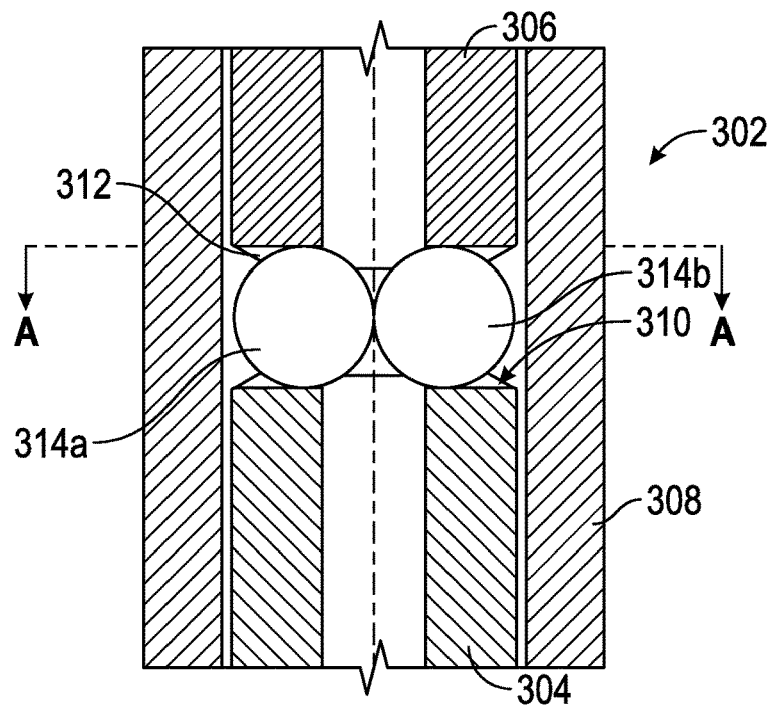
FIG. 13 is a partial cross-sectional view of an apparatus for applying axial movement with a rotating member. Only a housing, the rotating member, and a second member are shown in section in FIG. 13.

FIG. 13 illustrates apparatus 302 including rotating member 304 (sometimes referred to as rotating segment) and second member 306 (sometimes referred to as second segment). Rotating member 304 and second member 306 may each be at least partially disposed within housing 308. Rotating member 304 may include first radial surface 310. Second member 306 may include second radial surface 312 opposing first radial surface 310. First radial surface 310 or second radial surface 312 may include a tapered surface as described above. In one embodiment, both radial surfaces 310, 312 include a tapered surface. The tapered surface may be an undulating waveform profile. It should be understood that rotating member 304 may be positioned above or below second member 306.

Apparatus 302 may include one or more rolling elements 314. In one embodiment, apparatus 302 includes two rolling elements 314a, 314b as shown in FIG. 13. Each rolling element may have, but is not limited to, a spherical outer surface having a diameter that is approximately equal to one-half of an inner diameter of housing 308 such that rolling elements 314a and 314b are in constant contact with one another. It should be understood that apparatus 302 may include any number of rolling elements. The number of rolling elements included in the downhole apparatus may be equal to the number of high points or ramps on each of radial surfaces 310 and 312. Each of the rolling elements may be the same size.

Rotating member 304 may rotate continuously relative to second member 306, i.e., rotating member 304 may rotate more than 360 degrees relative to second member 306. In one embodiment, second member 306 is a non-rotating member. Non-rotating member means that the member is not designed to rotate and the member is substantially non-rotating relative to the rotating member. In another embodiment, second member 306 is a member rotating at a different rotation rate than rotating member 304. Rotation rate is the speed of rotation, which may be measured in units of rotation or revolutions per minute (RPM). In a further embodiment, second member 306 and rotating member 304 rotate in opposite directions. In all embodiments, as rotating member 304 rotates relative to second member 306, rolling elements 314 move between first and second radial surfaces 310 and 312 thereby producing an axial movement of second member 306 relative to rotating member 304. Rolling elements 314 may each move 360 degrees along a circular path relative to second radial surface 312. Rolling elements 314 may also each move 360 degrees along a circular path relative to first radial surface 310. The movement of rolling elements 314 on first and second radial surfaces 310 and 312 may occur simultaneously, such that rolling elements 314 move 360 degrees along a circular path relative to the first radial surface 310 and simultaneously move 360 degrees along a circular path relative to the second radial surface 312.

It should be understood that apparatus 302 is not limited to the directional and inclinational arrangement shown. In other words, apparatus 302 will function as long as first radial surface 310 opposes second radial surface 31 with one or more rolling elements disposed between. Apparatus 302 may be arranged in an inverted vertical position relative to the one shown in these drawings. Apparatus 302 may also be arranged in a horizontal position or any other inclinational position.

Figure 14A:
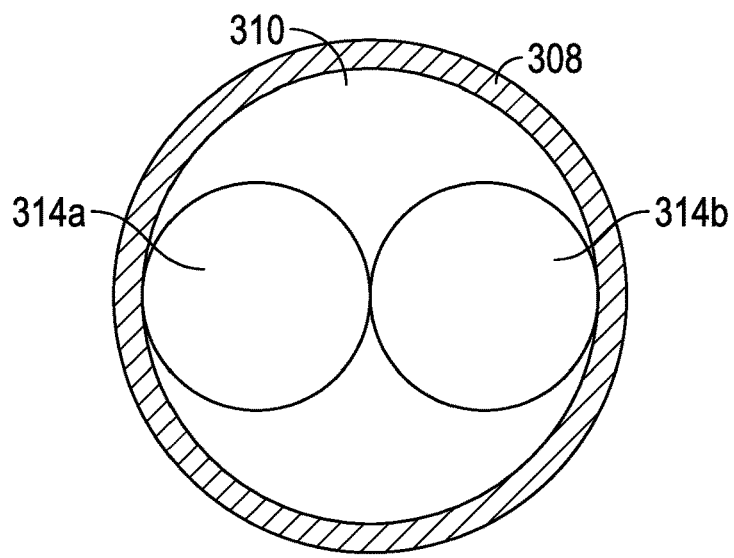
FIG. 14A is a cross-sectional view of the apparatus taken along line A-A in FIG. 13.
Figure 14B:
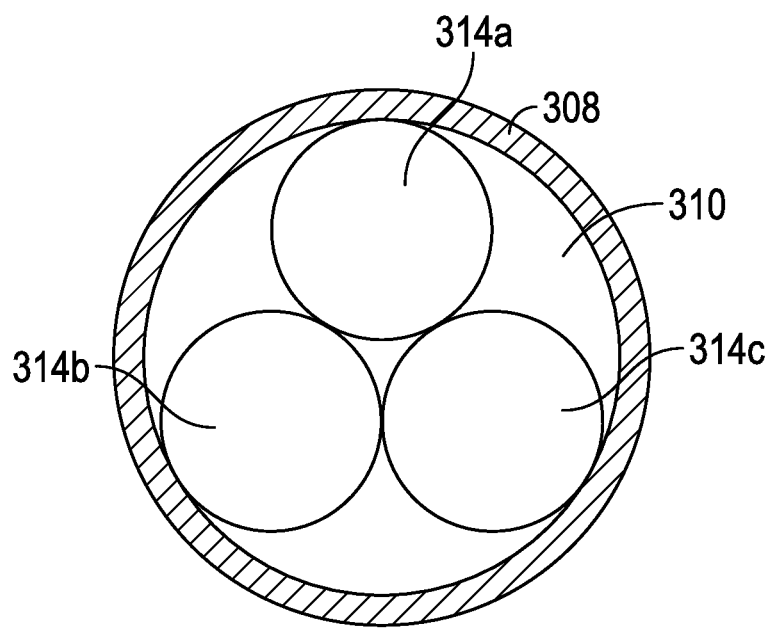
FIG. 14B is an alternate cross-sectional view of the apparatus taken along line A-A in FIG. 13.
Figure 14C:
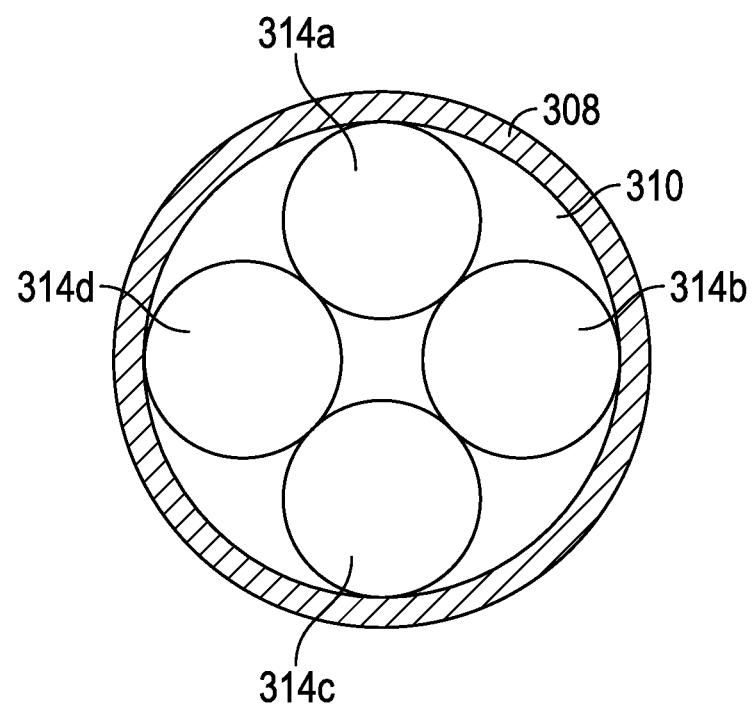
FIG. 14C is another alternate cross-sectional view of the apparatus taken along line A-A in FIG. 13.
Figure 14D:
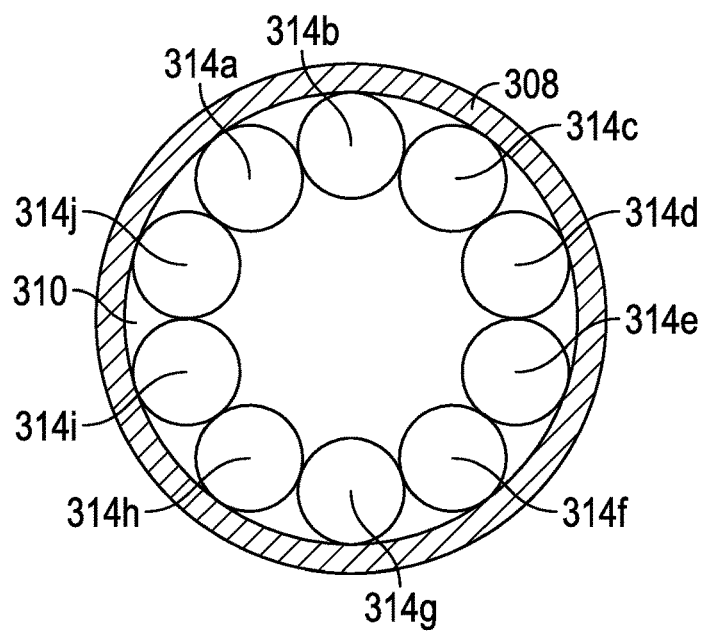
FIG. 14D is yet another alternate cross-sectional view of the apparatus taken along line A-A in FIG. 13.

FIG. 14A is a cross-sectional view taken along line A-A in FIG. 13 showing rolling elements 314a, 314b on first radial surface 310 disposed within housing 308. FIG. 14B is an alternate cross-sectional view taken along line A-A in FIG. 13. In this embodiment, apparatus 302 includes three rolling elements, namely rolling elements 314a, 314b, 314c. FIG. 14C is another alternate cross-sectional view taken along line A-A in FIG. 13 showing apparatus 302 including four rolling elements, namely rolling elements 314a, 314b, 314c, 314d. FIG. 14D is yet another alternate cross-sectional view taken along line A-A in FIG. 13 showing apparatus 302 including ten rolling elements, namely rolling elements 314a, 314b, 314c, 314d, 314e, 314f, 314g, 314h, 314i, 314j. Each rolling element in FIGS. 14B, 14C, and 14D may be dimensioned such that each rolling element is in contact with two adjacent rolling elements.

Figure 15:
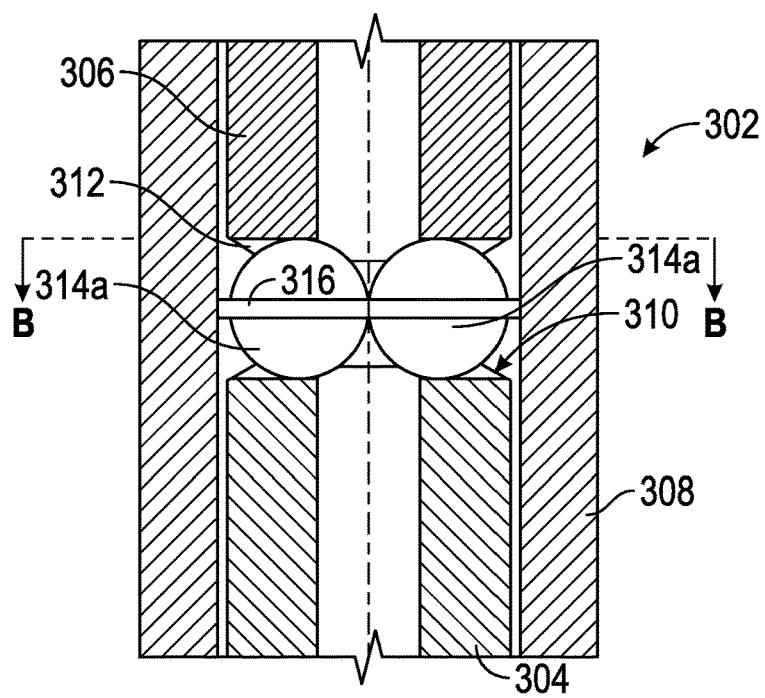
FIG. 15 is a partial cross-sectional view of the apparatus of FIG. 13 including a guide member. Only the housing, the rotating member, and the second member are shown in section.
Figure 16A:
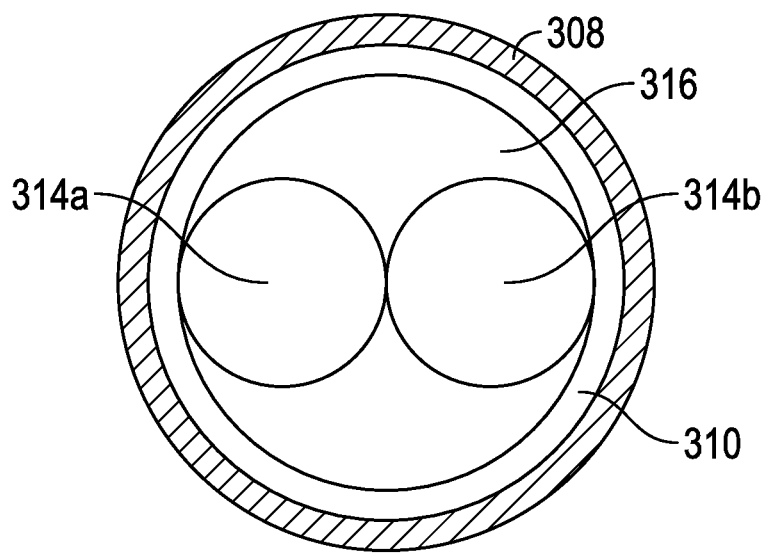
FIG. 16A is a cross-sectional view of the apparatus taken along line B-B in FIG. 15.
Figure 16B:
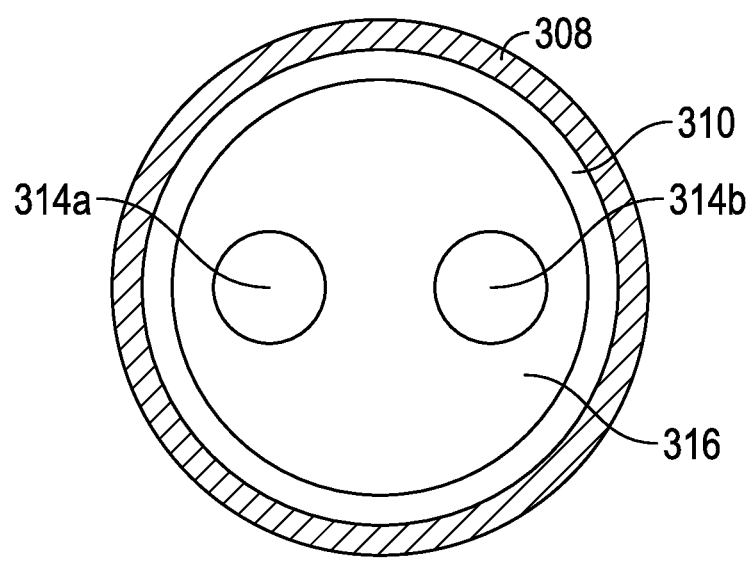
FIG. 16B is an alternate cross-sectional view of the apparatus taken along line B-B in FIG. 15.
Figure 16C:
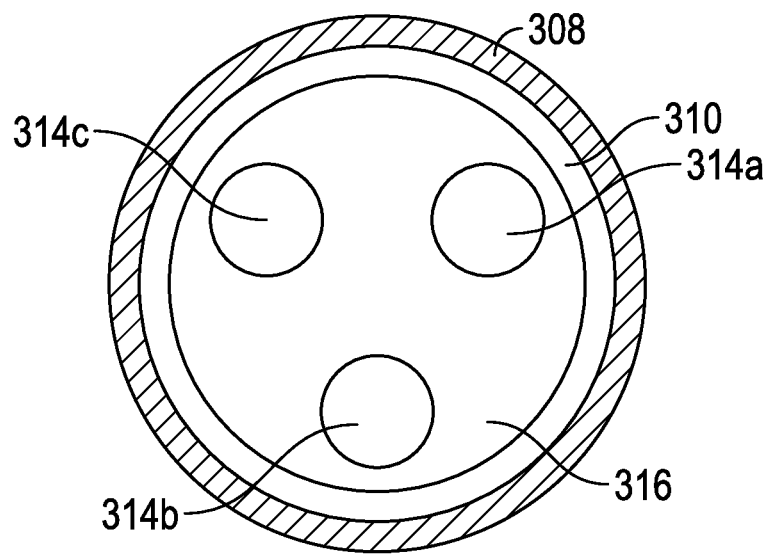
FIG. 16C is another alternate cross-sectional view of the apparatus taken along line B-B in FIG. 15.
Figure 16D:
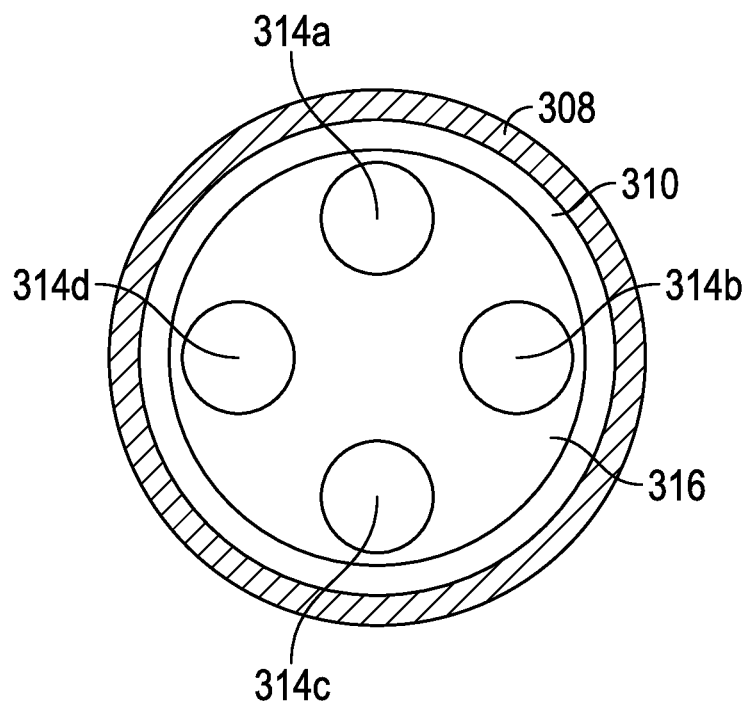
FIG. 16D is yet another alternate cross-sectional view of the apparatus taken along line B-B in FIG. 15.

FIG. 15 illustrates apparatus 302 having guide member 316 disposed between radial surfaces 310 and 312. Guide member 316 may be used to contain rolling elements 314a and 314b in a fixed position relative to one another. FIG. 16A is a cross-sectional view taken along line B-B in FIG. 15 showing rolling elements 314a, 314b retained by guide member 316 on first radial surface 310 disposed within housing 308. In this embodiment, rolling elements 314a, 314b are dimensioned so that they are in constant contact with one another. FIG. 16B is an alternate cross-sectional view taken along line B-B in FIG. 15. In this embodiment, apparatus 302 includes two rolling elements 314a, 314b, with the rolling elements dimensioned so that they are separated from one another. Guide member 316 retains rolling elements 314a, 314b in a fixed position relative to one another, such as 180 degrees apart. FIG. 16C is another alternate cross-sectional view taken along line B-B in FIG. 15. In this embodiment, apparatus 302 includes three rolling elements 314a, 314b, 314c, with the rolling elements dimensioned so that they are separated from one another and retained in a fixed position relative to one another by guide member 316, such as 120 degrees apart. FIG. 16D is yet another alternate cross-sectional view taken along line B-B in FIG. 15. In this embodiment, apparatus 302 includes four rolling elements 314a, 314b, 314c, 314d, with the rolling elements dimensioned so that they are separated from one another and retained in a fixed position relative to one another by guide member 316, such as 90 degrees apart. It is to be understood that guide member 316 may be used with any number of rolling elements 314. Use of guide member 316 is preferred when rolling elements 314 are dimensioned so that each rolling element does not constantly contact two adjacent rolling elements, such as in the embodiments shown in FIGS. 16B, 16C, and 16D.

Although the present invention has been described in considerable detail with reference to certain preferred versions thereof, other versions are possible. Therefore, the spirit and scope of the appended claims should not be limited to the description of the preferred versions contained herein.

The invention claimed is:

1. An apparatus for boring a wellbore, the wellbore containing a workstring concentrically positioned therein, the apparatus comprising:
   a bit body having a first end, an inner cavity, and a second end, wherein the first end is connected to the workstring, said workstring configured to deliver a rotational force to said bit body, wherein the inner cavity contains a profile having a first radial cam surface and one or more increased diameter circumference areas, and wherein the second end includes a working face containing a cutting member;
   a pilot bit rotatively connected within the inner cavity and extending from the working face, said pilot bit including a first end and a second end, wherein the first end has a second radial cam surface operatively configured to cooperate with the first radial cam surface to deliver a hammering force, and wherein the second end of the pilot bit includes an engaging surface configured to engage a formation surrounding the wellbore;
   one or more retainers operatively associated with the pilot bit for retaining the pilot bit within the inner cavity, each retainer comprising a ball bearing member;
   at least two rolling elements disposed between and in contact with the first radial cam surface and the second radial cam surface, wherein the at least two rolling elements are in direct contact with one another, and wherein a diameter of each of the rolling elements is approximately equal to one-half of an inner diameter of the inner cavity;
   wherein each of the one or more increased diameter circumference areas is adapted for placement of one of the one or more retainers; and
   wherein the bit body rotates at a different rate than the pilot bit.

2. The apparatus of claim 1, wherein said first radial cam surface comprises an inclined portion and an upstanding portion.

3. The apparatus of claim 2, wherein said second radial cam surface comprises an inclined portion and an upstanding portion.

4. The apparatus of claim 3, wherein said engaging surface comprises an eccentric conical surface.

5. The apparatus of claim 3, wherein said engaging surface comprises a chiseled surface.

6. The apparatus of claim 3, wherein the workstring contains a mud motor for delivering rotational force.

7. The apparatus of claim 6, wherein the workstring is a tubular drill string.

8. The apparatus of claim 6, wherein the workstring is a coiled tubing string.

9. The apparatus of claim 1 wherein each of the at least two rolling elements includes a spherical outer surface.

10. The apparatus of claim 1, wherein the at least two rolling elements comprises three or more rolling elements, wherein each of the three or more rolling elements is in direct contact with two adjacent rolling elements.

11. The apparatus of claim 1, further comprising a guide member, the guide member disposed between the first and second radial cam surfaces for retaining the rolling elements in a fixed position relative to one another.

12. A method of boring a wellbore comprising the steps of:
   a) providing a bit apparatus within the wellbore, said bit apparatus comprising: a bit body having a first end, an inner cavity, and a second end, wherein the first end is connected to the workstring, said workstring configured to deliver a rotational force to said bit body, wherein the inner cavity contains a profile having a first radial cam surface and one or more increased diameter circumference areas, and wherein the second end includes a working face containing a cutting member; a pilot bit rotatively connected within the inner cavity and extending from the working face, said pilot bit having a first end and a second end, wherein the first end has a second radial cam surface operatively configured to cooperate with the first radial cam surface to deliver a hammering force, and wherein the second end of the pilot bit includes having an engaging surface configured to engage a formation surrounding the wellbore; one or more retainers operatively associated with the pilot bit for retaining the pilot bit within the inner cavity, each retainer comprising a ball bearing member; at least two rolling elements disposed between and in contact with the first radial cam surface and the second radial cam surface, wherein the at least two rolling elements are in direct contact with one another, and wherein a diameter of each of the rolling elements is approximately equal to one-half of an inner diameter of the inner cavity; wherein each of the one or more increased diameter circumference areas is adapted for placement of one of the one or more retainers; and wherein the bit body rotates at a different rate than the pilot bit;

b) lowering the bit apparatus into the wellbore;

c) contacting the cutting member of the working face with a reservoir interface;

d) rotating the bit body relative to the pilot bit;

e) engaging the engaging surface of the pilot bit with the reservoir interface in the wellbore;

f) impacting the second radial cam surface with the first radial cam surface so that a percussive force is delivered to the cutting members and the engaging surface while boring the wellbore with the bit apparatus.

13. The method of claim 12, wherein said first radial cam surface comprises an inclined portion and an upstanding portion.

14. The method of claim 13, wherein said second radial cam surface comprises an inclined portion and an upstanding portion.

15. The method of claim 14, wherein the workstring contains a mud motor for delivering a rotational force.

16. The method of claim 15, wherein the workstring is a tubular drill string.

17. The method of claim 15, wherein the workstring is a coiled tubing string.

18. The method of claim 15, wherein the engaging surface is an eccentric conical surface.

19. The method of claim 15, wherein the engaging surface is a chiseled surface.

20. The method of claim 12, wherein step (f) further includes impacting the second radial cam surface with the first radial cam surface through the rolling elements.

21. The method of claim 20, wherein each of the rolling elements includes a spherical outer surface.

22. An apparatus for boring a well, with the apparatus connected to a workstring, the apparatus comprising:
a bit body having a first end, an inner cavity, and a second end, wherein the first end is connected to the workstring, said workstring configured to deliver a rotational force to said bit body, wherein the inner cavity contains a profile having a first radial cam surface, and wherein the second end includes a working face containing a plurality of cutting members;
a pilot bit rotatively connected within the inner cavity and extending from the working face, said pilot bit having a first end and a second end, wherein the first end contains a profile having a second radial cam surface and wherein the second end contains an engaging surface configured to engage a formation surrounding the wellbore;
at least two rolling elements disposed between and in contact with the first radial cam surface and the second radial cam surface, wherein the at least two rolling elements are configured to be in direct contact with one another, and wherein a diameter of each of said at least two rolling elements is approximately equal to one-half of an inner diameter of the inner cavity;
wherein the first radial cam surface comprises an undulating waveform profile and the second radial cam surface comprises either an undulating waveform profile or a radial flat surface or wherein the second radial cam surface comprises an undulating waveform profile and the first radial cam surface comprises either an undulating waveform profile or a radial flat surface; and
wherein the bit body rotates relative to the pilot bit thereby causing the at least two rolling elements to move over the first and second radial cam surfaces resulting in axial movement of the pilot bit relative to the bit body.

23. The apparatus of claim 22, wherein said workstring contains a mud motor for delivering rotational force.

24. The apparatus of claim 23, further comprising a retainer operatively associated with said pilot bit for retaining said pilot bit within the inner cavity.

25. The apparatus of claim 23, wherein said engaging surface comprises an eccentric conical surface.

26. The apparatus of claim 23, wherein said engaging surface comprises a chiseled surface.

27. The apparatus of claim 23, wherein the workstring is a tubular drill string.

28. The apparatus of claim 23, wherein the workstring is a coiled tubing string.

29. The apparatus of claim 22, wherein the pilot bit rotates at a different rotational rate than the bit body.

30. The apparatus of claim 22, wherein each of the at least two rolling elements includes a spherical outer surface.

31. The apparatus of claim 30, wherein each of the at least two rolling elements comprises a stainless steel or ceramic bearing ball.

32. The apparatus of claim 22, wherein the at least two rolling elements comprises three or more rolling elements, wherein each of the three or more rolling elements is in direct contact with two adjacent rolling elements.

33. The apparatus of claim 22, further comprising a guide member, the guide member disposed between the first and second radial cam surfaces for retaining the at least two rolling elements in a fixed position relative to one another.

34. The apparatus of claim 22, wherein the undulating waveform profile of the first radial cam surface includes a plurality of high points and wherein the number of at least two rolling elements is equal to the plurality of high points.

35. The apparatus of claim 22, wherein the undulating waveform profile of the second radial cam surface includes a plurality of high points and wherein the number at least two rolling elements is equal to the plurality of high points.

36. A method of boring a wellbore comprising the steps of:

a) providing a bit apparatus within the wellbore, the bit apparatus comprising: a bit body having a first end, an inner cavity, and a second end, wherein the first end is connected to the workstring, the workstring configured to deliver a rotational force to the bit body, wherein the inner cavity contains a profile having a first radial cam surface, and wherein the second end includes a working face containing a plurality of cutting members; a pilot bit rotatively connected within the inner cavity and extending from the working face, the pilot bit having a first end and a second end, wherein the first end contains a profile having a second radial cam surface and wherein the second end contains an engaging surface configured to engage a formation surrounding the wellbore; at least two rolling elements disposed between and in contact with the first radial cam surface and the second radial cam surface, wherein the at least two rolling elements are configured to be in direct contact with one another, and wherein a diameter of each of said at least two rolling elements is approximately equal to one-half of an inner diameter of the inner cavity; wherein the first radial cam surface comprises an undulating waveform profile and the second radial cam surface comprises either an undulating waveform profile or a radial flat surface or wherein the second radial cam surface comprises an undulating waveform profile and the first radial surface comprises either an undulating waveform profile or a radial flat surface; and wherein the bit body rotates relative to the pilot bit thereby causing the at least two rolling elements to move over the first and second radial cam surfaces resulting in axial movement of the pilot bit relative to the bit body;

b) lowering the bit apparatus into the wellbore;

c) contacting the cutting member of the working face with a reservoir interface;

d) rotating the bit body relative to the pilot bit;

e) causing the at least two rolling elements to move over the first and second radial cam surfaces resulting in axial movement of the pilot bit relative to the bit body to make contact with the reservoir interface while boring the wellbore with the bit apparatus.

37. The method of claim 36, wherein the workstring contains a mud motor for delivering a rotational force.

38. The method of claim 37, wherein the workstring is a tubular drill string.

39. The method of claim 37, wherein the workstring is a coiled tubing string.

40. The method of claim 37, wherein the engaging surface is an eccentric conical surface.

41. The method of claim 37, wherein the engaging surface is a chiseled surface.

42. The method of claim 36, wherein in step (d), the pilot bit is rotated due to frictional forces associated with rotation of the bit body, wherein a rotation rate of the pilot bit is different than a rotation rate of the bit body.

* * * * *